United States Patent
Suzuki et al.

(10) Patent No.: US 11,565,511 B2
(45) Date of Patent: Jan. 31, 2023

(54) CO-INJECTION MOLDED MULTILAYER STRUCTURE AND METHOD FOR PRODUCING SAME

(71) Applicant: KURARAY CO., LTD., Kurashiki (JP)

(72) Inventors: Makoto Suzuki, Kurashiki (JP); Didier Houssier, Zwijndrecht (BE)

(73) Assignee: KURARAY CO., LTD., Kurashiki (JP)

( * ) Notice: Subject to any disclaimer, the term of this patent is extended or adjusted under 35 U.S.C. 154(b) by 103 days.

(21) Appl. No.: 16/617,651

(22) PCT Filed: Jun. 4, 2018

(86) PCT No.: PCT/JP2018/021424
§ 371 (c)(1),
(2) Date: Nov. 27, 2019

(87) PCT Pub. No.: WO2018/225698
PCT Pub. Date: Dec. 13, 2018

(65) Prior Publication Data
US 2020/0086617 A1    Mar. 19, 2020

(30) Foreign Application Priority Data
Jun. 5, 2017 (JP) .............................. JP2017-111006

(51) Int. Cl.
| | | |
|---|---|---|
| B32B 27/30 | (2006.01) |
| B29C 45/00 | (2006.01) |
| B29C 45/16 | (2006.01) |
| B32B 27/08 | (2006.01) |
| B32B 27/32 | (2006.01) |
| B65D 65/40 | (2006.01) |
| C08L 23/06 | (2006.01) |
| B29K 23/00 | (2006.01) |
| B29L 9/00 | (2006.01) |

(52) U.S. Cl.
CPC ........ *B32B 27/306* (2013.01); *B29C 45/0001* (2013.01); *B29C 45/16* (2013.01); *B32B 27/08* (2013.01); *B32B 27/32* (2013.01); *B65D 65/40* (2013.01); *C08L 23/06* (2013.01); *B29K 2023/065* (2013.01); *B29K 2023/086* (2013.01); *B29K 2995/0067* (2013.01); *B29L 2009/00* (2013.01); *B32B 2250/03* (2013.01); *B32B 2250/40* (2013.01); *B32B 2307/7244* (2013.01); *B32B 2435/00* (2013.01); *B32B 2439/00* (2013.01); *C08L 2203/10* (2013.01); *C08L 2205/025* (2013.01); *C08L 2205/03* (2013.01); *C08L 2207/062* (2013.01); *Y10T 428/1383* (2015.01)

(58) Field of Classification Search
CPC ...... B65D 41/00; B65D 41/005; B65D 41/02; B65D 41/023; B65D 41/04; B65D 41/0407; B65D 41/0414; B65D 41/0421; B65D 41/0428; B65D 41/0435; B65D 41/0442; B65D 41/045; B65D 41/0457; B65D 41/0464; C08L 23/0853; B32B 27/306; B32B 2250/03; B32B 2250/40; B32B 27/06; Y10T 428/1379; Y10T 428/1383; C09J 2423/00; B29C 45/13
USPC ......................................................... 428/36.7
See application file for complete search history.

(56) References Cited

U.S. PATENT DOCUMENTS

| 4,929,482 A * | 5/1990 | Moritani ................. B32B 27/08 428/36.4 |
| 6,398,059 B1 * | 6/2002 | Hayashi .................. B32B 27/34 220/562 |
| 2003/0018114 A1 * | 1/2003 | Tai .......................... C08L 29/04 524/413 |
| 2005/0153087 A1 * | 7/2005 | Tsuji ........................ C08K 3/10 428/35.7 |
| 2009/0169902 A1 | 7/2009 | Inubushi et al. |
| 2009/0220718 A1 | 9/2009 | Isoyama et al. |
| 2011/0027583 A1 * | 2/2011 | Lee .......................... B32B 15/08 428/355 R |
| 2012/0052225 A1 * | 3/2012 | Kani ....................... C08L 29/04 428/35.4 |
| 2012/0128961 A1 | 5/2012 | Yoshida et al. |

FOREIGN PATENT DOCUMENTS

| JP | 2001-146116 A | 5/2001 |
| JP | 2001-341535 A | 12/2001 |

(Continued)

OTHER PUBLICATIONS

International Search Report dated Aug. 28, 2018 in PCT/JP2018/021424 filed on Jun. 4, 2018, 2 pages.

*Primary Examiner* — Lee E Sanderson
(74) *Attorney, Agent, or Firm* — Oblon, McClelland, Maier & Neustadt, L.L.P.

(57) ABSTRACT

There is provided a co-injection molded multilayer structure comprising a barrier layer and outer layers laminated to contact with the barrier layer on its both sides, wherein the barrier layer is made of a resin composition (X) comprising an ethylene-vinyl alcohol copolymer (A) and an alkali metal salt (B) of a higher fatty acid, having a melting point of 250° C. or lower; the ethylene-vinyl alcohol copolymer (A) has an ethylene unit content of 20 to 60 mol % and a saponification degree of 90% or more, and a content of the alkali metal salt (B) in the barrier layer is 50 to 1500 ppm in terms of metal atoms; and the outer layers are made of a resin composition (Y) comprising an unmodified high-density polyethylene (F) and a maleic anhydride-modified polyethylene (G), and a maleic anhydride modification rate relative to the whole resin composition (Y) is 0.005 to 0.1 wt %. This co-injection molded multilayer structure has excellent adhesiveness, so that its oxygen barrier performance can be maintained even after being subjected to an impact due to falling or the like.

10 Claims, No Drawings

(56) References Cited

FOREIGN PATENT DOCUMENTS

| JP | 2005-187808 A | 7/2005 |
|---|---|---|
| WO | WO 00/51907 | 9/2000 |
| WO | WO 2007/126157 A1 | 11/2007 |
| WO | WO 2009/107629 A1 | 9/2009 |
| WO | WO 2011/027741 A1 | 3/2011 |

* cited by examiner

CO-INJECTION MOLDED MULTILAYER STRUCTURE AND METHOD FOR PRODUCING SAME

TECHNICAL FIELD

The present invention relates to a co-injection molded multilayer structure having a barrier layer made of an ethylene-vinyl alcohol copolymer resin composition and outer layers laminated to contact with the barrier layer on its both sides.

BACKGROUND ART

An ethylene-vinyl alcohol copolymer (hereinafter, sometimes referred to as "EVOH") is a polymer material having excellent barrier performance against a gas such as oxygen and an organic agent, which is extensively used as a variety of packaging material such as a film, a sheet and a container.

EVOH is a hygroscopic resin, and its barrier performance is deteriorated by moisture absorption. Therefore, for preventing moisture absorption by EVOH, a multilayer structure in which hydrophobic resin layers such as polyolefin layers are disposed on both sides of an EVOH layer is often used as a container or the like. However, an EVOH layer is less adhesive to a hydrophobic resin layer. It is, therefore, common that an adhesive resin layer such as a maleic-anhydride-modified polyolefin is disposed between these layers. However, a complex layer structure inevitably leads to a higher production cost. Thus, it has been needed to develop an approach for adhering an EVOH layer to a hydrophobic resin layer without employing an adhesive resin layer.

When a multilayer structure is produced by co-injection molding, molten multiple types of resins are concurrently injected from multiple cylinders into a mold. Then, the resin as a laminate flows and fills a mold to give a multilayer structure. Since it is technically difficult to form a uniform adhesive resin layer between an EVOH layer and a hydrophobic resin layer, hydrophobic resin layers are formed on both sides of an EVOH layer, not via an adhesive resin layer.

Patent Reference No. 1 has described a molded part used for a fuel container, which is a laminate of a barrier resin (A) layer and a thermoplastic resin (B) layer having a solubility parameter of 11 or less, and has described that the molded part has excellent mechanical strength. In Examples therein, there is described a multilayer fuel container which is produced by co-injecting EVOH and a blend of polyethylene and maleic anhydride-modified polyethylene such that an EVOH layer is sandwiched by layers of the blend.

Patent Reference No. 2 has described an oxygen-absorbing resin composition comprising a thermoplastic resin containing a carbon-carbon double bond substantially only in a main chain and a transition metal salt, wherein oxygen absorption per one mole of a carbon-carbon double bond in the thermoplastic resin is 1.6 moles or more. The reference has also described a resin composition wherein the thermoplastic resin particles are dispersed in a matrix resin such as EVOH, so that it develops higher oxygen barrier performance by oxygen absorption by the thermoplastic resin.

PRIOR ART REFERENCES

Patent References

Patent Reference No. 1: JP 2001-146116 A
Patent Reference No. 2: WO 2007/126157 A

SUMMARY OF THE INVENTION

Problems to be Solved by the Invention

In accordance with the invention described in Patent Reference No. 1, there is described a co-injected multilayer structure comprising an EVOH layer and polyethylene resin composition layers laminated on both sides of the EVOH layer, wherein these layers are laminated with some adhesiveness. The inventors have, however, found that when such a container made of a co-injection molded multilayer structure having no adhesion layers, for example, falls in the course of transportation, delamination occurs and thus fine cracks are generated in the EVOH layer, possibly leading to oxidation degradation of a content in the container while no problem occurs in an appearance of the container.

Means for Solving the Problems

To solve the above problems, the following inventions are provided.

(1) A co-injection molded multilayer structure comprising a barrier layer and outer layers laminated to contact with the barrier layer on its both sides, wherein the barrier layer is made of a resin composition (X) comprising an ethylene-vinyl alcohol copolymer (A) and an alkali metal salt (B) of a higher fatty acid, having a melting point of 250° C. or lower;

the ethylene-vinyl alcohol copolymer (A) has an ethylene unit content of 20 to 60 mol % and a saponification degree of 90% or more, and a content of the alkali metal salt (B) in the barrier layer is 50 to 1500 ppm in terms of metal atoms; and the outer layers are made of a resin composition (Y) comprising an unmodified high-density polyethylene (F) and a maleic anhydride-modified polyethylene (G), and a maleic anhydride modification rate relative to the whole resin composition (Y) is 0.005 to 0.1 wt %.

(2) The co-injection molded multilayer structure as described in (1), wherein an MFR ratio (F/A) at 190° C./2160 g of the unmodified high-density polyethylene (F) to the ethylene-vinyl alcohol copolymer (A) is 0.04 to 50.

(3) The co-injection molded multilayer structure as described in (1) or (2), wherein an MFR ratio (G/F) at 190° C./2160 g of the maleic anhydride-modified high-density polyethylene (G) to the unmodified high-density polyethylene (F) is 0.5 to 100.

(4) The co-injection molded multilayer structure as described in any of (1) to (3), wherein a mass ratio [G/(F+G)] of the maleic anhydride-modified polyethylene (G) to the total of the unmodified high-density polyethylene (F) and the maleic anhydride-modified polyethylene (G) is 0.025 to 0.2.

(5) The co-injection molded multilayer structure as described in any of (1) to (4), wherein the alkali metal salt (B) is at least one of sodium stearate and potassium stearate.

(6) The co-injection molded multilayer structure as described in any of (1) to (5), wherein the barrier layer further contains a thermoplastic resin (C) having a carbon-carbon double bond and at least one transition metal salt (D) selected from the group consisting of an iron salt, a nickel salt, a copper salt, a manganese salt and a cobalt salt.

(7) The co-injection molded multilayer structure as described in (6), wherein the thermoplastic resin (C) is polyoctenylene.

(8) The co-injection molded multilayer structure as described in any of (1) to (7), wherein the barrier layer further contains a moisture absorbent (E).

(9) A container consisting of the co-injection molded multilayer structure as described in any of (1) to (8).

(10) A cap consisting of the co-injection molded multilayer structure as described in any of (1) to (8).

(11) A method for producing the multilayer structure as described in any of (1) to (8), comprising co-injection molding a resin composition (X) containing an ethylene-vinyl alcohol copolymer (A) and an alkali metal salt (B) and a resin composition (Y) containing an unmodified high-density polyethylene (F) and a maleic anhydride-modified polyethylene (G).

Effects of the Invention

Although a co-injection molded multilayer structure of the present invention does not have any adhesive layer, a barrier layer made of an EVOH resin composition is highly adhesive to outer layers made of a resin composition containing an unmodified high-density polyethylene and a maleic anhydride-modified polyethylene. Consequently, its oxygen barrier performance can be maintained even after being subjected to an impact due to falling or the like.

MODES FOR CARRYING OUT THE INVENTION (Resin Composition (X))

The present invention relates to a co-injection molded multilayer structure having a barrier layer and outer layers laminated to contact with the barrier layer on its both sides, wherein the barrier layer is made of a resin composition (X) containing an EVOH (A) and an alkali metal salt (B) of a higher fatty acid, having a melting point of 250° C. or lower.

An EVOH (A) used in the present invention is preferably a saponification product of an ethylene-vinyl ester copolymer, more preferably a saponification product of an ethylene-vinyl acetate copolymer. An ethylene unit content of the EVOH (A) is 20 to 60 mol %. The ethylene unit content of 20 mol % or more allows for improving melt-moldability. The ethylene unit content is preferably 25 mol % or more. Meanwhile, the ethylene unit content of 60 mol % or less allows for improving barrier performance. The ethylene unit content is preferably 50 mol % or less, more preferably 40 mol % or less.

A saponification degree of the EVOH (A) is 90% or more. Here, a saponification degree is a proportion of vinyl alcohol units in the total of vinyl ester units and vinyl alcohol units contained in the EVOH (A). The saponification degree of 90% or more allows for improving barrier performance and thermostability during melt molding. The saponification degree is preferably 98% or more, more preferably 99% or more.

Copolymerization of ethylene with a vinyl ester can involve other monomers as copolymerization components. Examples of such monomers include α-olefins such as propylene, isobutylene, α-octene and α-dodecene; unsaturated acids such as acrylic acid, methacrylic acid, crotonic acid, maleic acid and itaconic acid, or anhydrides, salts or mono- or di-alkyl esters thereof; nitriles such as acrylonitrile and methacrylonitrile; amides such as acrylamide and methacrylamide; olefin-sulfonic acids such as ethylenesulfonic acid, allylsulfonic acid and methallylsulfonic acid, or salts thereof; alkyl vinyl ethers; vinyl ketones; N-vinylpyrrolidone; vinyl chloride; and vinylidene chloride. However, a content of components derived from other monomers is preferably 10 mol % or less, more preferably 5 mol % or less, further preferably 1 mol % or less.

The EVOH (A) preferably has a melt flow rate (MFR) of 1 to 20 g/10 min at 190° C. and 2160 g. The MFR of 1 g/10 min or more allows for fast flowing of the EVOH (A) during injection molding, and thus uniformly forming a barrier layer even to the end of a multilayer structure. The MFR is more preferably 2 g/10 min or more, further preferably 3 g/10 min or more. The MFR of more than 20 g/10 min may lead to deterioration of strength of a barrier layer. The MFR is more preferably 15 g/10 min or less, further preferably 13 g/10 min or less.

A barrier layer of the present invention is made of a resin composition (X) comprising an EVOH (A) and an alkali metal salt (B) of a higher fatty acid, having a melting point of 250° C. or lower. The alkali metal salt (B) has a melting point of 250° C. or lower and can be thus molten during melt molding. Here, a viscosity of the molten alkali metal salt (B) is much lower than that of the EVOH (A), so that the alkali metal salt (B) is concentrated at an interface between a barrier layer and an adjacent layer by a shear force during injection molding. As a result, interaction between maleic anhydride units in a resin composition layer (Y) described as below and the alkali metal salt (B) develops higher adhesion force.

An alkali metal salt (B) of a higher fatty acid, having a melting point of 250° C. or lower is preferably a salt of a fatty acid having 12 to 30 carbon atoms. A larger carbon number contributes to achieving a melting point equal to or lower than 250° C. The carbon number is more preferably 14 or more, further preferably 16 or more. Preferable examples of a salt-forming fatty acid include saturated fatty acids such as lauric acid, myristic acid, palmitic acid, stearic acid, arachidic acid and behenic acid. An unsaturated fatty acid such as oleic acid and linoleic acid may be used, but in the light of thermostability, a saturated fatty acid is preferable and stearic acid is particularly preferable. A salt-forming alkali metal is preferably, but not limited to, potassium or sodium, more preferably potassium in the light of further improvement in adhesiveness. Specific examples of an alkali metal salt (B) include potassium stearate and sodium stearate, particularly preferably potassium stearate.

A content of an alkali metal salt (B) in the barrier layer is 50 to 1500 ppm in terms of metal atoms. If the content of the alkali metal salt (B) is less than 50 ppm in terms of metal atoms, adhesiveness is insufficiently improved. The content of the alkali metal salt (B) is preferably 100 ppm or more, more preferably 150 ppm or more in terms of metal atoms. If the content of the alkali metal salt (B) is more than 1500 ppm in terms of metal atoms, appearance of a molded article is deteriorated. The content of the alkali metal salt (B) is preferably 1000 ppm or less, more preferably 750 ppm or less, further preferably 500 ppm or less in terms of metal atoms.

There are no particular restrictions to a method for adding an alkali metal salt (B) to an EVOH (A); the EVOH (A) and the alkali metal salt (B) can be preliminarily melt-kneaded to give a resin composition (X) which is then supplied for co-injection molding, or the EVOH (A) and the alkali metal salt (B) can be melt-kneaded by a co-injection molding machine. In the light of giving a uniform molded article, it is preferable to preliminarily conduct melt-kneading using an extruder, suitably a twin screw extruder to give pellets, which are then supplied for co-injection molding.

Preferably, the barrier layer further contains a thermoplastic resin (C) having a carbon-carbon double bond and at least one transition metal salt (D) selected from the group consisting of iron, nickel, copper, manganese and cobalt salts. The presence of a transition metal salt (D) allows for easy oxidation of a carbon-carbon double bond contained in the thermoplastic resin (C), so that oxygen molecules passing through the barrier layer can be trapped and a very high level of oxygen barrier performance can be developed. The term "carbon-carbon double bond" as used herein does not include a double bond contained in an aromatic ring.

The amount of a carbon-carbon double bond contained in the thermoplastic resin (C) is preferably 0.001 to 0.02 mol/g. Double bonds contained in the thermoplastic resin (C) can be mutually separated by two methylenes like polybutadiene, but preferably, in the light of an oxygen-absorption efficiency, double bonds contained in the thermoplastic resin (C) are mutually separated by three or more methylenes. Among others, a thermoplastic resin (C) is preferably polyoctenylene. Polyoctenylene can be produced by ring-opening polymerization of cyclooctene. A preferable weight-average molecular weight of the thermoplastic resin (C) is 1,000 to 500,000. Such a thermoplastic resin (C) can be produced by, for example, the method described in Patent Reference No. 2.

The transition metal salt (D) is added for promoting an oxidation reaction of the thermoplastic resin (C). Examples of the transition metal salt (D) include iron, nickel, copper, manganese and cobalt salts. Among these, a cobalt salt is preferable. An anionic species in the transition metal salt (D) is preferably a carboxylic acid anion. Examples of such a carboxylic acid include, but not limited to, acetic acid, stearic acid, acetylacetone, dimethyldithiocarbamic acid, palmitic acid, 2-ethylhexanoic acid, neodecanoic acid, linoleic acid, tall oil acid, oleic acid, capric acid and naphthenic acid. Examples of a particularly preferable salt used as a transition metal salt (D) include cobalt stearate, cobalt 2-ethylhexanoate and cobalt neodecanoate. The transition metal salt (D) can be a so-called ionomer, which has an ionic polymer as a counterion.

A preferable content of the thermoplastic resin (C) in the barrier layer is 1 to 30 parts by mass based on 100 parts by mass of the EVOH (A). A preferable content of the transition metal salt (D) in the barrier layer is 1 to 50,000 ppm in terms of metal elements. There are no particular restrictions to a method for blending the thermoplastic resin (C) and the transition metal salt (D), and preferably, they are blended by melt-kneading them concurrently with the alkali metal salt (B).

Preferably, the barrier layer further contains a moisture absorbent (E). Examples of a moisture absorbent (E) which can be used include a phosphoric acid salt and a sulfuric acid salt. Examples of the phosphoric acid salt include an anhydride of at least one salt selected from the group consisting of sodium phosphate ($Na_3PO_4$), disodium hydrogen phosphate ($Na_2HPO_4$), sodium dihydrogen phosphate ($NaH_2PO_4$), sodium polyphosphate, lithium phosphate, dilithium hydrogen phosphate, lithium dihydrogen phosphate, lithium polyphosphate, potassium phosphate, dipotassium hydrogen phosphate, potassium dihydrogen phosphate, potassium polyphosphate, calcium phosphate ($Ca_3(PO_4)_2$), calcium hydrogen phosphate ($CaHPO_4$), calcium dihydrogen phosphate ($Ca(H_2PO_4)_2$), calcium polyphosphate, ammonium phosphate, diammonium hydrogen phosphate, ammonium dihydrogen phosphate and ammonium polyphosphate. Examples of the sulfuric acid salt include a sulfate of an alkaline-earth metal such as beryllium (beryllium sulfate ($BeSO_4 \cdot 4H_2O$)), magnesium (magnesium sulfate ($MgSO_4 \cdot 7H_2O$)) and calcium (calcium sulfate ($CaSO_4 \cdot 2H_2O$)), and further a transition metal capable of forming a divalent ion such as copper (cupric sulfate ($CuSO_4$).$5H_2O$)), zinc (zinc sulfate ($ZnSO_4 \cdot 7H_2O$)) and iron (ferrous sulfate ($FeSO_4 \cdot 7H_2O$)). Examples of a sulfate of a trivalent metal include sulfuric acid salts of a metal such as aluminum (aluminum sulfate ($Al_2(SO_4)_3 \cdot 16H_2O$)) and iron.

A preferable content of the moisture absorbent (E) in the barrier layer is 1 to 50 parts by mass based on 100 parts by mass of the EVOH (A). There are no particular restrictions to a method for blending the moisture absorbent (E), but it is preferably blended by melt-kneading together with the alkali metal salt (B).

A barrier layer of the present invention can contain an inorganic filler. A content of the inorganic filler in the barrier layer is preferably 50% by mass or less, more preferably 20% by mass or less, further preferably 10% by mass or less. The barrier layer can contain a further component other than the EVOH (A), the alkali metal salt (B), the thermoplastic resin (C), the transition metal salt (D), the moisture absorbent (E) and the inorganic filler, and its content is preferably 20% by mass or less, more preferably 10% by mass or less, further preferably 5% by mass or less.

(Resin Composition (Y))

The outer layers, laminated to contact with the barrier layer made of the resin composition (X) on its both sides, are made of a resin composition (Y) containing an unmodified high-density polyethylene (F) (hereinafter, a high-density polyethylene is sometimes abbreviated as an "HDPE") and a maleic anhydride-modified polyethylene (G) (hereinafter, a maleic anhydride-modified polyethylene is sometimes abbreviated as a "maleic anhydride-modified PE"). From observation obtained in preparing a resin composition (X) containing an EVOH (A) and an alkali metal salt (B), the inventors had believed that the maleic anhydride-modified PE (G) was not concentrated in an interface between a barrier layer and an adjacent resin when the maleic anhydride-modified PE (G) having a higher melt viscosity was dispersed in the HDPE (F) having a lower melt viscosity, leading to insufficient adhesiveness between the barrier layer and the outer layers. However, the inventors have surprisingly found that even when the maleic anhydride-modified PE (G) having a higher viscosity is used, a multilayer structure having enough adhesion force for practical use when being processed to be a container can be obtained.

The HDPE (F) is an HDPE substantially consisting of hydrocarbon monomers which is not modified with a polar monomer. The HDPE (F) can be, therefore, a homopolymer of ethylene, or a copolymer copolymerized with propylene in 5% by mass or less. The maleic anhydride-modified PE (G) is a PE modified with maleic anhydride which is a polar monomer. A polyethylene (polyethylene before modification) as a base of the maleic anhydride-modified PE (G) can be also a homopolymer of ethylene, or a copolymer copolymerized with propylene in 5% by mass or less. Furthermore, in order to improve adhesiveness of a multilayer structure obtained, it is necessary that a maleic anhydride modification rate relative to the whole resin composition (Y) is 0.005 to 0.1 wt %. The modification rate is more preferably 0.015 wt % or more.

An MFR of the HDPE (F) at 190° C. and 2160 g is preferably 0.1 to 100 g/10 min. The MFR of 0.1 g/10 min or more at 190° C. and 2160 g allows for easy injection molding. The MFR is preferably 0.2 g/10 min or more, further preferably 1.0 g/10 min or more. Meanwhile, the MFR of 100 g/10 min or less at 190° C. and 2160 g allows for providing a molded article with a good appearance. The MFR is more preferably 50 g/10 min or less, further preferably 30 g/10 min or less.

An MFR of the maleic anhydride-modified PE (G) at 190° C. and 2160 g is preferably 0.5 to 200 g/10 min. The MFR of 0.5 g/10 min or more at 190° C. and 2160 g allows for improving adhesiveness between the barrier layer and the outer layers. The MFR is more preferably 1 g/10 min or more. If the MFR at 190° C. and 2160 g is more than 200 g/10 min, a melt viscosity is so reduced that it becomes difficult to produce the maleic anhydride-modified PE (G).

It is preferable that a mass ratio [G/(F+G)] of the maleic anhydride-modified polypropylene (G) to the total of the HDPE (F) and the maleic anhydride-modified PE (G) is 0.025 to 0.2. The mass ratio [G/(F+G)] of 0.025 or more allows for improving adhesiveness between the barrier layer and the outer layers. The mass ratio [G/(F+G)] is more preferably 0.03 or more, and further preferably 0.04 or more. If the mass ratio [G/(F+G)] is more than 0.2, appearance of a molded article obtained may be deteriorated. The mass ratio [G/(F+G)] is more preferably 0.13 or less, further preferably 0.08 or less.

An MFR ratio (F/A) at 190° C./2160 g of the HOPE (F) to the EVOH (A) is preferably 0.04 to 5. The MFR ratio (F/A) of 0.04 to 5 allows for producing a molded article with good appearance. The MFR ratio (F/A) is more preferably 3 or less, further preferably 1 or less. The MFR ratio (F/A) is more preferably 0.1 or more.

An MFR ratio (G/F) at 190° C./2160 g of the maleic acid-modified PE (G) to the HDPE (F) is preferably 0.5 to 100. The MFR ratio (G/F) of 0.5 to 100 allows for producing a molded article with good appearance. The MFR ratio (G/F) is more preferably 70 or less, further preferably 50 or less, particularly preferably 20 or less.

There are no particular restrictions to a method for blending the HDPE (F) and the maleic anhydride-modified PE (G); the unmodified PE (F) and the maleic anhydride-modified PE (G) can be preliminarily melt-kneaded to give a resin composition, which is then supplied for co-injection molding, or the HDPE (F) and the maleic anhydride-modified PE (G) can be dry-blended to give mixed pellets, followed by melt-kneading in a co-injection molding machine.

For co-injection molding, a resin composition (X) containing the EVOH (A) and the alkali metal salt (B), and a resin composition (Y) containing the HDPE (F) and the maleic anhydride-modified PE (G) are co-injection molded, so that the former forms a barrier layer while the latter forms outer layers laminated to contact with the barrier layer on its both sides. Here, a further layer can be formed on the outer sides of the outer layers, but a preferable layer structure is a three-layer structure of outer layer (resin composition (Y))/ barrier layer (resin composition (X))/outer layer (resin composition (Y)).

Injection timing of each resin composition can be appropriately adjusted, depending on the shape of a desired multilayer structure. First, injection of a composition for both (that is, inner and outer) outer layers is initiated, and then injection of a composition for the barrier layer is initiated, so that exposure of the barrier layer at the tip can be prevented. Furthermore, finally, only the outer layer composition is injected so that exposure of the barrier layer in a gate section can be also prevented. There are no particular restrictions to a temperature during injection molding as long as it is equal to or higher than a melting point of a resin used, and is equal to or higher than a melting point of the alkali metal salt (B).

A thickness ratio of the barrier layer to the outer layers is preferably, but not limited to, 1 to 20 when the total thickness of both outer layers is assumed to be 100. A thickness of the barrier layer is more preferably 2 or more. A thickness of the barrier layer is more preferably 15 or less.

A co-injection molded multilayer structure thus obtained can be used for various applications including a container to which barrier performance is required, such as a food container and an organic chemical container. It is particularly preferably used for a bottle or a cap for beverage or a medical vial.

EXAMPLES

There will be further described the present invention with reference to, but not limited to, Examples. Methods for evaluating a sample in Examples are as described below.
(1) Ethylene Unit Content and Saponification Degree of an EVOH (A)

Determined by $^1$H-NMR spectrometry (measuring apparatus: JNM-GX-500, from JEOL Ltd.) using DMSO-$d_6$ as a solvent.
(2) Melt Flow Rate (MFR)

Determined by measuring an outlet velocity (g/10 min) of a sample under the conditions of a temperature of 190° C. or 230° C. and a load of 2160 g, using a melt indexer (L244, from Takara Kogyo).
(3) Melting Point (Tm)

A melting point (Tm) was determined in accordance with JIS K 7121, using a differential scanning calorimeter (DSC) (Q2000, from TA Instruments, Inc.).
(4) Oxygen Transmission Rate (OTR)

A cap produced as described later was mounted to a 500 mL PET bottle and an OTR of the bottle was measured under the following conditions, using an oxygen transmission rate measuring apparatus, Ox-Tran Model 2/21 (Modern Control Inc.).

Inside of the bottle: 23° C., nitrogen, 100% RH
Outside of the bottle: 23° C., air, 50% RH A capped bottle filled with water was dropped perpendicularly to a concrete surface from a height of 1 m in an inverted state (in such a direction that the cap is downward directed), and for the bottle after dropping, an OTR was measured under the conditions described above. For 5 bottles, an OTR after dropping was measured and an average was calculated as an OTR after the drop test.
(5) Moisture Permeability A moisture permeability (water vapor transmission rate; WVTR) was measured using a vapor permeation measuring device (GTR TEC Corporation, "GTR-WV") in accordance with a gas chromatography method (JIS-K7129-C). Specifically, a moisture permeability (unit: $g/(m^2 \cdot day)$) was measured under the conditions of temperature: 40° C., humidity at a steam injection port: 90% RH, and humidity at a carrier gas port: 0% RH. A moisture permeability was measured for an unmodified HDPE with a monolayer film thickness of 100 μm as a sample.
(6) Drop Test To 62 mL of an aqueous solution of methylene blue was added 1.2 g of a fine powder of crosslinked maleic anhydride-isobutene copolymer to prepare an oxygen detection composition, which was then stored in a 50 mL vial prepared as described later and sealed with a rubber stopper. This vial was dropped from a height of 30 cm perpendicularly to a concrete surface in an upright state (a state in which the rubber stopper is upward directed). The vial after dropping was allowed to stand under the atmosphere of 23° C. and 50% RH. The number of days until the oxygen detection composition in the vial turned to be blue was counted and evaluated in accordance with the following criteria.
- A: 7 days or more
- B: 4 to 6 days
- C: 2 to 3 days
- D: 1 day or less

[PE Brands]

In Examples, unmodified HDPEs (F) and maleic anhydride-modified PEs (G) used were as follows.

[Unmodified HDPE (F)]
- Ineos Ltd., Eltex Superstress CAP508S2, MFR=1.8 g/10 min (190° C., load: 2160 g)
- Ineos Ltd., Rigidex HD5502S, MFR=0.2 g/10 min (190° C., load: 2160 g)

[Maleic Anhydride-Modified PE (G)]
- Eval Europe N.V., ALP-063, MFR=7 g/10 min (190° C., load: 2160 g), maleic anhydride modification rate 0.4 wt %
- Two H Chem Ltd., NOVACOM-P HFS2100P, MFR=25 g/10 min (190° C., load: 2160 g), maleic anhydride modification rate 1.0 wt %

Example 1

An EVOH (Kuraray Co., Ltd., EVAL F104B) having an ethylene unit content of 32 mol %, a saponification degree of 99 mol % or more, an MFR of 4.4 g/10 min (190° C., load: 2160 g) and an OTR of 2.0 cc·20 μm/m$^2$·day·atm (20° C./85% RH) was mixed with potassium stearate as an alkali metal salt of a higher fatty acid (B) such that a content of potassium stearate in the EVOH was to be 200 ppm in terms of metal atoms. Then, the mixture was melt-kneaded, pelletized and further dried under the conditions described below, to give EVOH resin composition pellets. A melting point of potassium stearate is 240° C.

Apparatus: 26 mmφ twin screw extruder (Labo Plastomill 15C300, from Toyo Seiki Seisaku-sho, Ltd.)
L/D: 25
Screw: equi-directional complete meshing type
Die hole number: 2 holes (3 mmφ)
Extrusion temperature (° C.): C1=200, C2 to C5=240, Die=240
Revolution: 100 rpm
Discharge rate: about 5 kg/hr
Drying: hot-air dryer 80° C., 6 hr Separately, 95 parts by mass of CAP508S2 (Ineos Ltd., MFR=1.8 g/10 min (190° C., load: 2160 g)) as an HDPE (F) and 5 parts by mass of ALP-063 (Eval Europe N.V., MFR=7 g/10 min (190° C., load: 2160 g)) as a maleic anhydride-modified PE (G) were dry-blended to give mixed PE pellets containing HDPE (F) pellets and maleic anhydride-modified PE (G) pellets.

Using the EVOH resin composition pellets and the mixed PE pellets thus obtained, co-injection molding was conducted under the conditions below, to give a cap for 500 mL PET bottle and a 50 mL vial which have co-injection molded multilayer structures. For the co-injection molded multilayer structures obtained, an OTR and an appearance were determined as described above. The results are shown in Table 1.

Apparatus: co-injection molding machine SYNERGY3000 from Nestal Machine Inc.
Screw diameter
  EVOH resin composition: 18 mmφ
  PE resin composition [the resin composition containing the HDPE (F) and the modified PE (G)]: 28 mmφ
Hot runner: Kortec, Inc.
EVOH resin composition/PE resin composition=9/91 (mass ratio)
Cap for a 500 mL PET bottle: diameter=36 mm, height=14 mm
50 mL vial: bottom diameter=43 mm, height=73 mm
Temperature conditions
  EVOH resin composition: Zone 1=220° C., Zone 2=245° C., Zone 3=255° C.
  PE resin composition: Zone 1=240° C., Zone 2=250° C., Zone 3=255° C., Zone 4=260° C., Zone 5=260° C.
Manifold: 255° C.
Injection pressure, time: 1200 bars, 4 sec
Mold temperature: 40° C.
Cycle time: 8.5 sec
Cooling time: 1 sec

TABLE 1

| | | Unit | Example 1 | Example 2 | Example 3 | Example 4 | Example 5 | Example 6 | Example 7 |
|---|---|---|---|---|---|---|---|---|---|
| | Molding method | — | Co-injection | Co-injection | Co-injection | Co-injection | Co-injection | Co-injection | Co-injection |
| (X) | Ethylene unit content in (A) | mol % | 32 | 32 | 32 | 32 | 32 | 32 | 32 |
| | MFR of (A) (190° C., load: 2160 g) | g/10 min | 4.4 | 4.4 | 4.4 | 4.4 | 4.4 | 5.2 | 4.8 |
| | Type of (B) | — | St-K*[1] | St-Na*[2] | St-K | St-K | St-K | St-K | St-K |
| | Content of (B) | ppm | 200 | 200 | 200 | 200 | 200 | 200 | 200 |
| (Y) | Type of (F) | — | HDPE | HDPE | HDPE | HDPE | HDPE | HDPE | HDPE |
| | MFR of (F) (190° C., load: 2160 g) | g/10 min | 1.8 | 1.8 | 1.8 | 1.8 | 0.2 | 1.8 | 1.8 |
| | WVTR of HDPE (F) | g·20 um/m$^2$·day | 6 | 6 | 6 | 6 | 6 | 6 | 6 |
| | MFR of (G) (190° C., load: 2160 g) | g/10 min | 7 | 7 | 25 | 7 | 7 | 7 | 7 |
| | Modification rate of (G) | wt % | 0.4 | 0.4 | 1.0 | 0.4 | 0.4 | 0.4 | 0.4 |
| | Modification rate of resin composition (Y) | wt % | 0.02 | 0.02 | 0.05 | 0.012 | 0.02 | 0.02 | 0.02 |
| | MFR ratio (F/A) | — | 0.41 | 0.41 | 0.41 | 0.41 | 0.05 | 0.35 | 0.38 |
| | MFR ratio (G/F) | — | 3.9 | 3.9 | 13.9 | 3.9 | 35 | 3.9 | 3.9 |
| | Mass ratio [G/(F + G)] | — | 0.05 | 0.05 | 0.05 | 0.03 | 0.05 | 0.05 | 0.05 |
| Cap | OTR before a drop test | cc/bottle·day | 0.01 | 0.01 | 0.01 | 0.01 | 0.01 | 0.005 | 0.01 |
| | OTR after a drop test | cc/bottle·day | 0.02 | 0.02 | 0.02 | 0.10 | 0.04 | 0.02 | 0.02 |
| Vial | Drop test | — | A | A | A | B | A | A | A |

TABLE 1-continued

|   |   | Unit | Comparative Example 1 | Comparative Example 2 | Comparative Example 3 | Comparative Example 4 |
|---|---|---|---|---|---|---|
|   | Molding method | — | Co-injection | Co-injection | Co-extrusion | Co-injection |
| (X) | Ethylene unit content in (A) | mol % | 32 | 32 | 32 | 32 |
|   | MFR of (A) (190° C., load: 2160 g) | g/10 min | 4.4 | 4.4 | 4.4 | 4.4 |
|   | Type of (B) | — | — | St-K | St-K | St-K |
|   | Content of (B) | ppm | — | 200 | 200 | 200 |
| (Y) | Type of (F) | — | HDPE | PP | HDPE | HDPE |
|   | MFR of (F) (190° C., load: 2160 g) | g/10 min | 1.8 | 30 | 1.8 | 1.8 |
|   | WVTR of HDPE (F) | g · 20 um/m² · day | 6 | 19 | 6 | 6 |
|   | MFR of (G) (190° C., load: 2160 g) | g/10 min | 7 | 36 | 7 | 7 |
|   | Modification rate of (G) | wt % | 0.4 | 2.0*³ | 0.4 | 0.4 |
|   | Modification rate of resin composition (Y) | wt % | 0.02 | 0.1 | 0.02 | 0.004 |
|   | MFR ratio (F/A) | — | 0.41 | 6.82 | 0.41 | 0.41 |
|   | MFR ratio (G/F) | — | 3.9 | 1.2 | 3.9 | 3.9 |
|   | Mass ratio [G/(F + G)] | — | 0.05 | 0.05 | 0.05 | 0.01 |
| Cap | OTR before a drop test | cc/bottle · day | 0.01 | 0.07 | 0.01 | 0.01 |
|   | OTR after a drop test | cc/bottle · day | 0.19 | 0.13 | 0.21 | 0.29 |
| Vial | Drop test | — | C | C | C | D |

*[1]Potassium stearate
*[2]Sodium stearate
*[3]Using a modified polypropylene

Examples 2 to 5, and Comparative Examples 1 to 4

Co-injection molded multilayer structures were produced and evaluated as described in Example 1, except that compositions of resin compositions used for a gas barrier layer and outer layers were changed as shown in Table 1. The results are shown in Table 1.

Example 6

The atmosphere of a 5-liter three-necked flask equipped with a stirrer and a thermometer was substituted with nitrogen. In the flask was charged 624 g of heptane solution in which 110 g (1.0 mol) of cyclooctene and 187 mg (1.7 mmol) of cis-4-octene were dissolved. Then, a catalyst solution was prepared by dissolving 8.48 mg (10 μmol) of benzylidene (1,3-dimesitylimidazolidin-2-ylidene)(tricyclohexylphosphine)ruthenium dichloride in 1 g of toluene, and was added to the above heptane solution, and then ring-opening metathesis polymerization was initiated at 70° C. After 5 min, gas chromatographic analysis ("GC-14B" from Shimadzu Corporation, Column: "G-100" from Chemicals Inspection & Testing Inst., Japan) of the reaction solution demonstrated disappearance of cyclooctene. 600 g of methanol was added to the reaction solution obtained, and the mixture was stirred at 40° C. for 30 min. After standing at 40° C. for one hour, the mixture was separated into phases and the lower phase was discarded. 600 g of methanol was again added to the upper phase, and the mixture was stirred at 40° C. for 30 min. After standing at 40° C. for one hour, the mixture was separated into phases and the lower phase was discarded. The upper phase was evaporated under a reduced pressure to remove low-boiling components such as heptane. The residue was dried at 50 Pa and 40° C. for 24 hours using a vacuum dryer, to give 101.2 g (yield: 90%) of a polyoctenylene in which a weight-average molecular weight was 158,000 and a content of oligomers with a molecular weight of 1,000 or less was 8.5% by mass.

For the polyoctenylene obtained, a ratio of carbon-carbon double bonds in side chains to the whole carbon-carbon double bonds was 0%. Here, the ratio based on the whole carbon-carbon double bonds is calculated as $100 \times b/(a+b)$, where the amount of carbon-carbon double bonds in the main chain is a (mol/g) and the amount of carbon-carbon double bonds in side chains is b (mol/g).

The whole polyoctenylene obtained was crushed into a size of about 1 mm³ and placed in a 500 mL separable flask equipped with a stirrer, a reflux condenser and a thermometer. After 300 g of acetone was added, the mixture was stirred at 40° C. for 3 hours. After acetone was removed by decantation, 300 g of acetone was again added, and the mixture was stirred at 40° C. for 3 hours. After acetone was removed by decantation, the residue was dried at 50 Pa and 100° C. for 6 hours using a vacuum dryer, to give 96.1 g of polyoctenylene in which a weight-average molecular weight was 163,000 and a content of oligomers having a molecular weight of 1,000 or less was 3.1% by mass.

An EVOH having an ethylene unit content of 32 mol %, a saponification degree of 99 mol % or more, an MFR of 5.2 g/10 min (190° C., load: 2160 g), polyoctenylene, cobalt stearate and potassium stearate were melt-kneaded, pelletized and then dried under the conditions described below, to give pellets of an EVOH resin composition. The resin composition (X) contains 92 parts by mass of the EVOH, 8 parts by mass of polyoctenylene, 200 ppm in terms of metal atoms of cobalt stearate, and 200 ppm in terms of metal atoms of potassium stearate.

Apparatus: 26 mmφ twin screw extruder (Labo Plastomill 15C300, from Toyo Seiki Seisaku-sho, Ltd.)
L/D: 25
Screw: equi-directional complete meshing type
Die hole number: 2 holes (3 mmφ)
Extrusion temperature (° C.): C1=200, C2 to C5=240, Die=240
Revolution: 100 rpm
Discharge rate: about 5 kg/hr
Drying: hot-air dryer 80° C., 6 hr A co-injection molded multilayer structure was produced as described in Example 1, except that the pellets of the EVOH resin composition thus obtained were used for co-injection molding. The co-injection molded multilayer structure thus obtained was evaluated as described in Example 1, and the results are shown in Table 1.

Example 7

An EVOH having an ethylene unit content of 32 mol %, a saponification degree of 99 mol % or more and an MFR of 4.8 g/10 min (190° C., load: 2160 g), disodium hydrogen phosphate, a dispersant and potassium stearate were melt-kneaded under the following conditions, pelletized and then dried, to give pellets of an EVOH resin composition. The resin composition (X) contains 80 parts by mass of the EVOH, 20 parts by mass of disodium hydrogen phosphate, 400 ppm of the dispersion and 200 ppm in terms of metal atoms of potassium stearate.

Apparatus: 26 mm$\phi$ twin screw extruder (Labo Plastomill 15C300, from Toyo Seiki Seisaku-sho, Ltd.)
L/D: 25
Screw: equi-directional complete meshing type
Die hole number: 2 holes (3 mm$\phi$)
Extrusion temperature (° C.): C1=200, C2 to C5=240, Die=240
Revolution: 100 rpm
Discharge rate: about 5 kg/hr
Drying: hot-air dryer 80° C., 6 hr A co-injection molded multilayer structure was produced as described in Example 1, except that the resin composition thus obtained was used for co-injection molding. The co-injection molded multilayer structure thus obtained was evaluated as described in Example 1, and the results are shown in Table 1.

The invention claimed is:

1. A co-injection molded multilayer structure, consisting of
a barrier layer and
outer layers laminated to contact with the barrier layer on both sides of the barrier layer,
wherein
the barrier layer comprises a first resin composition comprising an ethylene-vinyl alcohol copolymer and an alkali metal salt of a higher fatty acid, having a melting point of 250° C. or lower;
the ethylene-vinyl alcohol copolymer has an ethylene unit content of from 20 to 60 mol % and a saponification degree of 90% or more, and a content of the alkali metal salt in the barrier layer is from 50 to 1500 ppm in terms of metal atoms; and
the outer layers comprise a second resin composition comprising an unmodified high-density polyethylene and a maleic anhydride-modified polyethylene, and a maleic anhydride modification rate relative to the second resin composition is from 0.005 to 0.1 wt %,
wherein an MFR ratio at 190° C./2160 g of the unmodified high-density polyethylene to the ethylene-vinyl alcohol copolymer is from 0.04 to 5.

2. The co-injection molded multilayer structure as claimed in claim 1, wherein an MFR ratio at 190° C./2160 g of the maleic anhydride-modified polyethylene to the unmodified high-density polyethylene is from 0.5 to 100.

3. The co-injection molded multilayer structure as claimed in claim 1, wherein a mass ratio of the maleic anhydride-modified polyethylene to the total of the unmodified high-density polyethylene and the maleic anhydride-modified polyethylene is from 0.025 to 0.2.

4. The co-injection molded multilayer structure as claimed in claim 1, wherein the alkali metal salt is at least one of sodium stearate and potassium stearate.

5. The co-injection molded multilayer structure as claimed in claim 1, wherein the barrier layer further comprises a thermoplastic resin having a carbon-carbon double bond and at least one transition metal salt selected from the group consisting of an iron salt, a nickel salt, a copper salt, a manganese salt and a cobalt salt.

6. The co-injection molded multilayer structure as claimed in claim 5, wherein the thermoplastic resin is polyoctenylene.

7. The co-injection molded multilayer structure as claimed in claim 1, wherein the barrier layer further comprises a moisture absorbent.

8. A container consisting of the co-injection molded multilayer structure as claimed in claim 1.

9. A cap consisting of the co-injection molded multilayer structure as claimed in claim 1.

10. A method for producing the multilayer structure as claimed in claim 1, the method comprising:
co-injection molding a first resin composition comprising an ethylene-vinyl alcohol copolymer and an alkali metal salt and a second resin composition comprising an unmodified high-density polyethylene and a maleic anhydride-modified polyethylene.

\* \* \* \* \*